(12) United States Patent
Park (10) Patent No.: US 6,513,420 B1
(45) Date of Patent: Feb. 4, 2003

(54) DEVICE FOR COUPLING A LID TO POT

(76) Inventor: Jong Peter Park, 1630 Summitridge Dr., Diamond Bar, CA (US) 91765

( * ) Notice: Subject to any disclaimer, the term of this patent is extended or adjusted under 35 U.S.C. 154(b) by 0 days.

(21) Appl. No.: 10/122,959

(22) Filed: Apr. 12, 2002

(51) Int. Cl.[7] .......................... A47J 27/08; A47J 27/092
(52) U.S. Cl. ........................ 99/337; 99/403; 220/314; 220/316; 220/573.1
(58) Field of Search .................. 99/330, 337, 338, 99/403–407, 339, 340, 342; 220/573.1, 314–318, 756, 293, 912, 393, 323, 324, 202–206, 203.7, 203.19, 203.22; 126/373.1, 377.1, 369; 219/401, 440; 292/256.67, 256.69, DIG. 11, 139, 140; 426/510, 511, 523

(56) References Cited

U.S. PATENT DOCUMENTS

| | | | | |
|---|---|---|---|---|
| 2,760,672 A | * | 8/1956 | Cronheim | 126/373.1 |
| 3,598,105 A | * | 8/1971 | Cristaldi | 220/912 X |
| 3,937,359 A | * | 2/1976 | Stockton, Jr. | 99/403 X |
| 4,005,645 A | * | 2/1977 | Janssen | 99/403 X |
| 4,298,789 A | * | 11/1981 | Eichelberger et al. | 219/401 X |
| 4,733,795 A | * | 3/1988 | Boehm | 220/316 X |
| 4,932,527 A | * | 6/1990 | Hayes | 99/331 X |
| 5,317,959 A | | 6/1994 | Beluzzi | |
| 5,348,187 A | * | 9/1994 | Schultz | 99/373.1 |
| 5,355,777 A | * | 10/1994 | Chen et al. | 99/407 X |
| 5,370,259 A | | 12/1994 | Cartigny | |
| 5,400,700 A | * | 3/1995 | Bois | 99/3 X |
| 5,427,014 A | | 6/1995 | von der Beke et al. | |
| 5,520,103 A | * | 5/1996 | Zielinski et al. | 126/369 X |
| 5,613,424 A | * | 3/1997 | Chameroy et al. | 99/337 |
| 5,678,721 A | * | 10/1997 | Cartigny et al. | 9/337 X |

\* cited by examiner

Primary Examiner—Timothy F. Simone (57) ABSTRACT

A device for coupling a lid to pot, which includes two clip plates for clipping a portion where a lid body and a pressure pot are engaged with each other, a handle body for accommodating a part of the clip plates thereinside, tension springs each being fixed to the handle body on one end thereof and to the clip plates on the other end thereof to constantly pull the clip plates to a second direction, namely, a central direction of the lid body, a grip lever being set to a first position to release the sealed lid body and pressure pot by being moved due to an external force by as far as a predetermined distance and thus pushing the clip plates to a first direction, namely, a peripheral direction of the lid body, and a push button for pushing the grip lever to a second position to seal the lid body and the pressure pot by moving the grip lever and forcing the clip plates to be moved to a second direction due to a force of the tension spring.

8 Claims, 8 Drawing Sheets

DEVICE FOR COUPLING A LID TO POT

BACKGROUND OF THE INVENTION

1. Field of the Invention

The present invention relates to a device for coupling a lid to pot, and more particularly, to a device for coupling a lid to pot, coupling and decoupling of which are easily handled in a simple manner that the lid of the pot is coupled and decoupled by downwardly pushing or pulling.

2. Background of the Related Art

In a general pressure pot as a kind of pot, a coupling wheel of a lid is rotated so as for the lid to be closely attached to the pot. The contents inside the pressure pot are boiled by maintaining the inside of the pressure pot at a high pressure.

In the conventional pressure pot, when the lid is closed to the pot, a coupling protrusion part of the pot is inserted into a coupling groove of a lid having a coupling wheel. Thereafter, a handle of the coupling wheel is turned in a direction, such that the coupling protrusion part of the pot is fixed with a coupling protrusion part of the coupling wheel of the lid. Therefore, the pot and the lid are closely coupled together. Further, if the handle of the coupling wheel is turned in opposite direction, the pot and the lid are separated from each other.

In the conventional pressure pot as stated above, the lid and the pot body are engaged with each other by turning the coupling wheel by means of the handle which is extended from a side part of the coupling wheel. The conventional pressure pot has a disadvantage that it is inconvenient in turning the handle since a force is bias applied on one side when the handle is grasped by a user to turn the coupling wheel. The conventional pressure pot has further another disadvantage that there is needed a strong force to turn the handle since a residual steam pressure exists after the process of boiling the contents is completed. The conventional pressure pot has a design portion to be enable to look good. So it can be look good if some portion of the cover redesigned.

SUMMARY OF THE INVENTION

Accordingly, the present invention is directed to a device for coupling a lid to a pot that substantially obviates one or more problems due to limitations and disadvantages of the related art.

An object of the present invention is to provide a device for coupling a lid to pot, which can easily couple a lid with a pressure pot and release the lid form the pressure pot.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a device for coupling a lid to pot includes two clip plates for clipping a portion where a lid body and a pressure pot are engaged with each other, a handle body for accommodating a part of the clip plates thereinside, tension springs each being fixed to the handle body on one end thereof and to the clip plates on the other end thereof to constantly pull the clip plates to a second direction, namely, a central direction of the lid body, a grip lever being set to a first position to release the sealed lid body and pressure pot by being moved due to an external force by as far as a predetermined distance and thus pushing the clip plates to a first direction, namely, a peripheral direction of the lid body, and a push button for pushing the grip lever to a second position to seal the lid body and the pressure pot by moving the grip lever and forcing the clip plates to be moved to a second direction due to a force of the tension spring.

Therefore, the lid can be easily opened and shut by operating the grip lever and the push button formed on the handle body. Meantime, the handle body may be separated from the lid body.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

A device for coupling a lid to pot according to the present invention is designed to easily open and shut a lid body 4 of a pressure pot 2. A safety valve 16, a pressure relief valve and the likes are installed on the lid body 4. The safety valve is an automatic valve for safety functioning to relieve an abnormal high pressure since it is dangerous if a pressure inside the pot is raised to a level over a normal value during cooking. The pressure relief valve functions to manually relieve the high pressure or a vacuum in advance so as for a lid to be opened when the cooking is completed. The lid body 4 has a recess 33 at a circumferential edge inside thereof for accepting and holding a silicon packing 15.

The device for coupling a lid to pot according to the present invention includes two clip plates 8 for clipping a portion where the lid body 4 and the pressure pot are engaged with each other, a triangular sliding plate 14 acting as a medium for moving positions of the two clip plates 8, a handle body 26 for accommodating a part of the clip plates 8, tension springs 20 each being fixed to the handle body 26 on an end thereof and to the clip plates 8 on other end thereof to constantly pull the clip plates 8 toward a second direction, namely, a central direction of the lid body 4, a grip lever 24 being fixed to a first position to release a sealed lid body 4 and pressure pot 2 by being moved with an operator's hand force by as far as a predetermined distance and pushing the clip plates 8 to a first direction, namely, a peripheral direction of the lid body 4, and a push button 6 for pushing the grip lever 24 to a second position by moving the grip lever 24 which is placed on the first position and forcing the clip plate 8 to be moved to a central direction of a lid due to a force of the tension springs 20 to seal the lid body 4 and the pressure pot.

The push button 6 functions to push the triangular sliding plate 14 and also to stop movement of the clip plates 8. The push button 6 is provided with two supports 9 on both low sides of the push plate 5. Nuts are formed on an end part of the each support 9. A nut 11 having a smaller diameter and a nut 13 having a larger diameter are position-adjusted and fixedly coupled on the end part of the support. The nuts 11 and 13 act as an opening preventing key 10. An upper nut should be smaller in size than a lower nut. It is desirable that the opening preventing key 10 is formed with two nuts for position control. However, the opening preventing key 10 may be formed with one nut having a stepped outer peripheral surface in which an external diameter becomes smaller as it goes upward. Compression springs 18 are attached on a lower part of the push plate 5. It is preferable that the compression spring 18 is installed at middle portion of the push plate 5. The compression springs 18 are installed in a spring accommodating part 27 which is formed on the handle body 26, thereby constantly upwardly pushing the push button 6 over the handle body 26. The each support 9 and the two nuts are coupled with the each clip plate 8, thereby preventing the push button from being raised beyond a predetermined level.

Each of the clip plate 8 is attached to a cylindrical roller 22 on an end part thereof and has a '⊂'-shaped clip 7 formed on other end part thereof. Second spring holders 23 are formed on both side surfaces of the two clip plates 8. The ⊂-shaped clips 7 clip edge portions of both the lid body 4 and the pot 2 so as to be sealed. Each of the cylindrical roller 22 is coupled to the end part of the each clip plate 8 with a shaft, so as to be rotated. An opening preventing groove 12 is formed on each of the clip plate 8 and allows the opening preventing key 10 to be inserted thereinto. The opening preventing key groove 12 takes a long hole shape which is formed by interconnecting two 8-shaped grooves. The each clip plate 8 is shifted relative to the each support 9 through the two interconnected grooves. In a state that the each clip plate 8 is shifted to the first direction or the second direction, the smaller nut 11 of the each support is closely attached to one groove among the two grooves due to a force of the compression spring 18.

Figure 9:
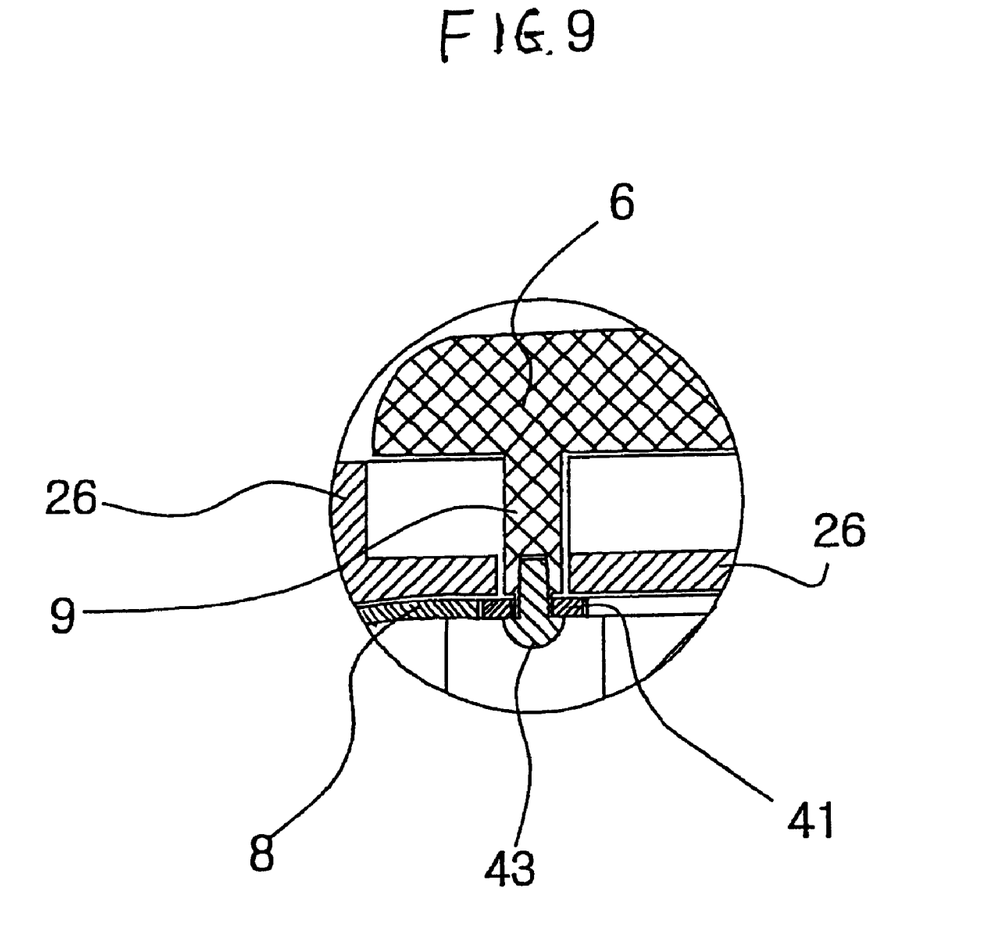
FIG. 9 illustrates a partial sectional view of another embodiment of an opening preventing key 10.

FIG. 9 illustrates a partial sectional view of another embodiment of an opening preventing key 10. In this embodiment, the opening preventing key 10 includes a support 9, a washer 41 and a bolt 43 which is fastening the washer to the support. The washer 41 has a diameter lager than that of the hole formed in the handle body 26 wherein the support 9 is inserted. The diameter of washer 41 is smaller than that of the opening preventing groove 12 formed in the clip plate 8. The washer 41 maintain the support 9 to be coupled with the handle body 26. If the washer 41 is inserted to the opening preventing groove 12 of the clip plate 8, then the clip plate 8 cannot move, so locked. If the washer 41 comes down from the groove 12, then the clip plate 8 may move along the groove 12 in being guided by the support 9. An opening preventing key 10 can be designed in many other ways by ordinary skilled person.

Figure 1:
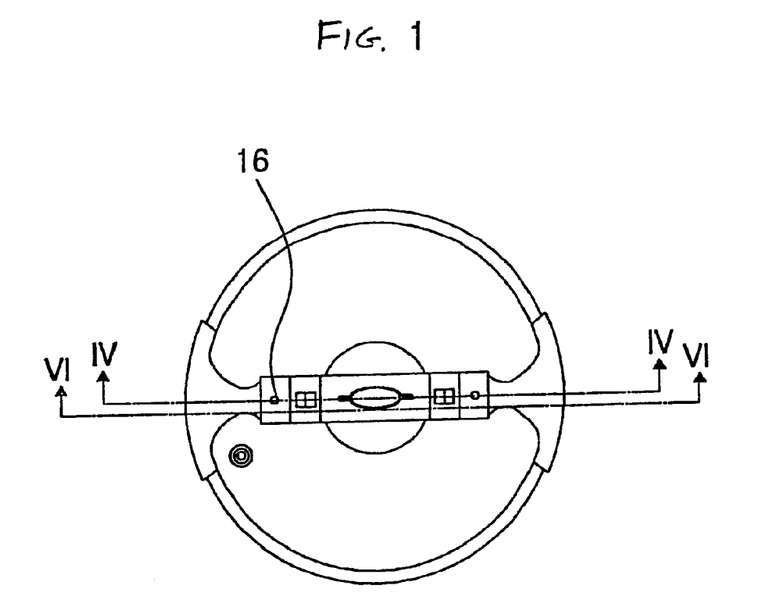
FIG. 1 illustrates a plan view of a device for coupling a lid to pot.
Figure 2:
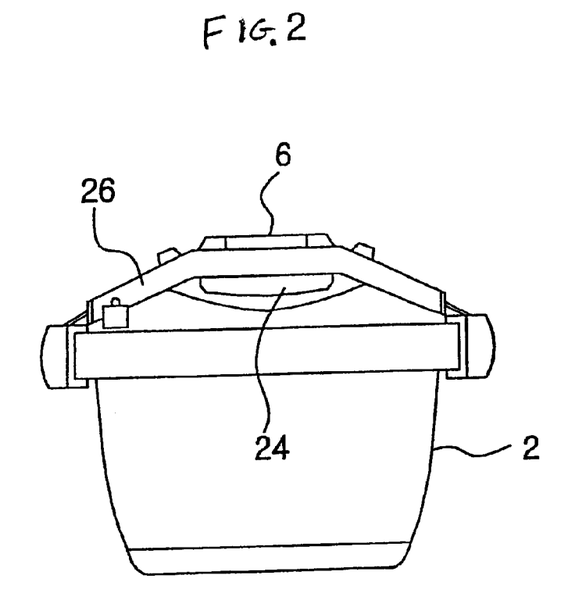
FIG. 2 illustrates a front view in a state that a lid is locked.
Figure 3:
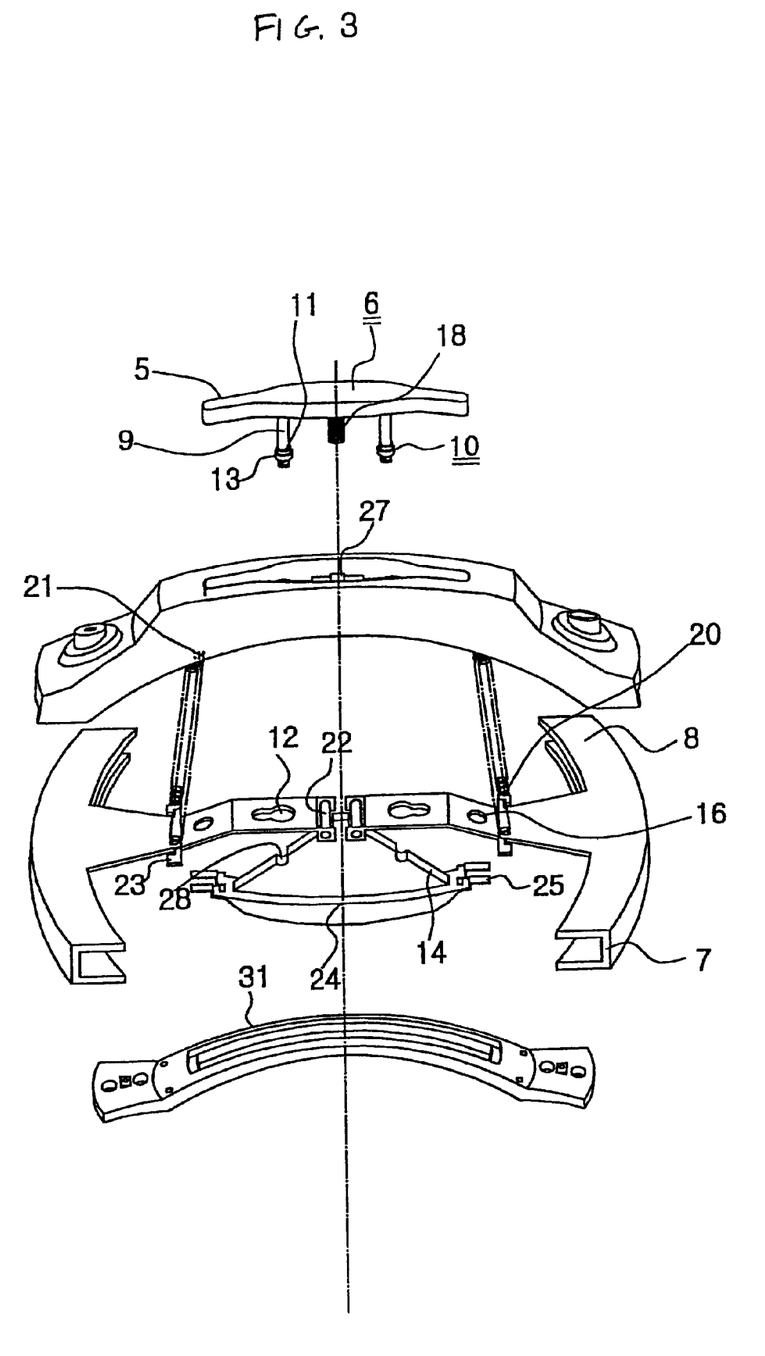
FIG. 3 illustrates elements in a state that elements of the present invention are decoupled.
Figure 4:
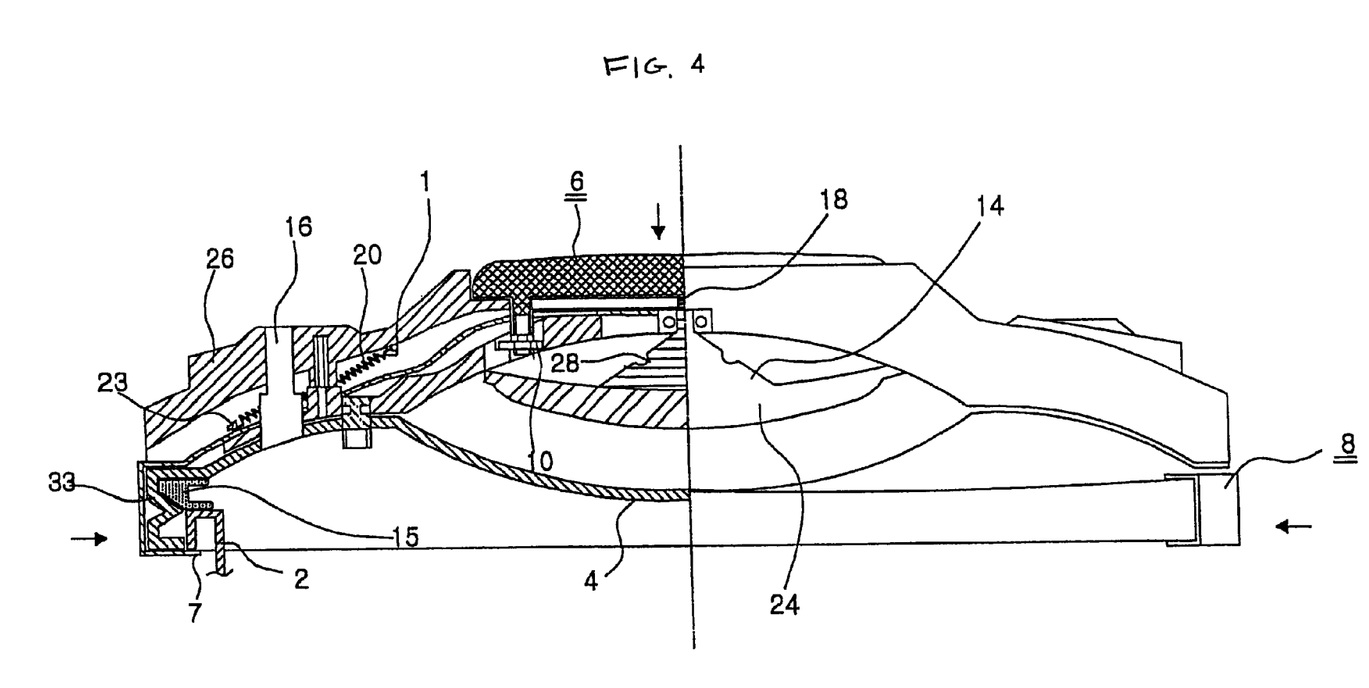
FIG. 4 illustrates a longitudinal sectional view through IV—IV of FIG. 1 in a course that a lid is locked.
Figure 5:
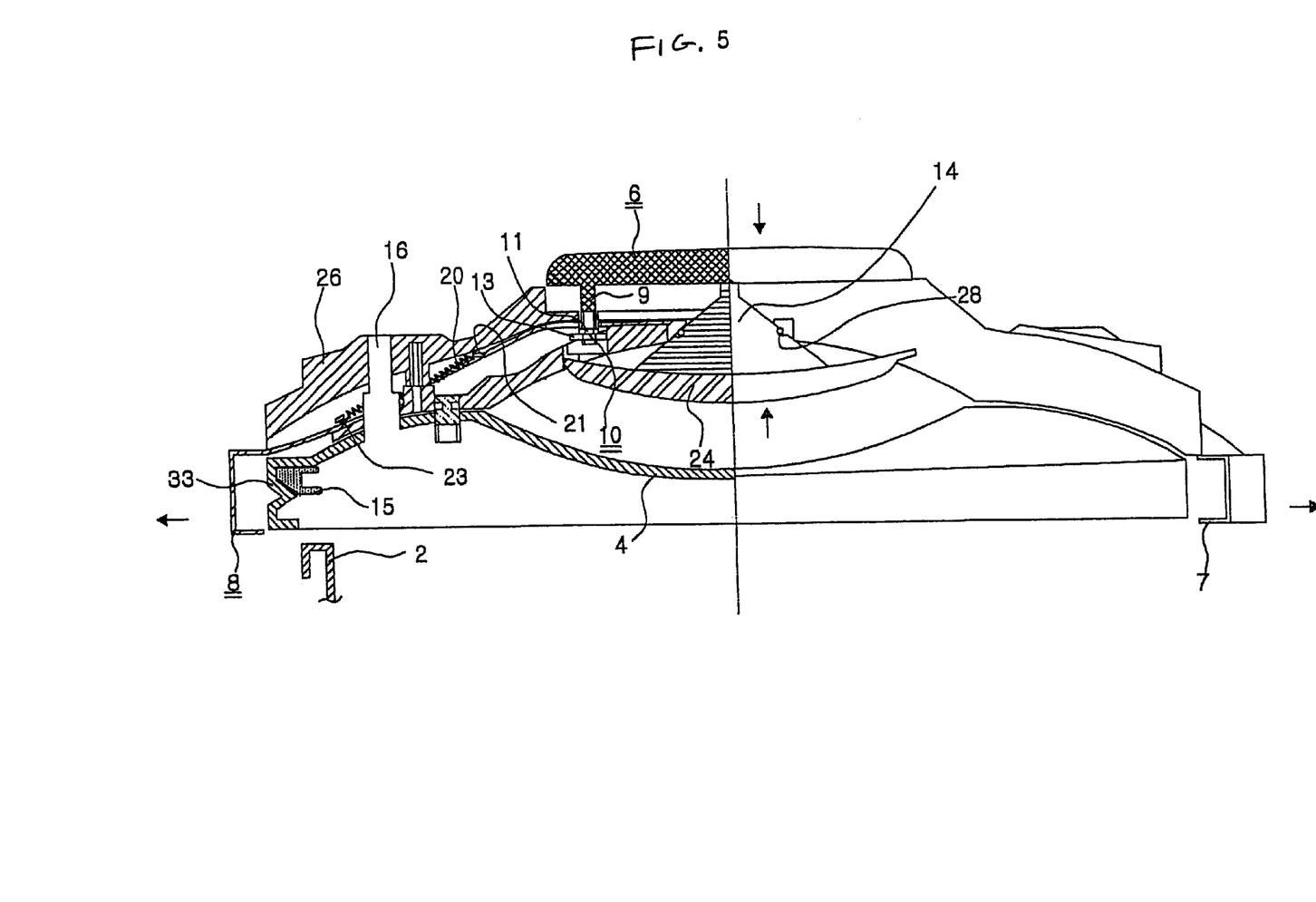
FIG. 5 illustrates a longitudinal sectional view through IV—IV of FIG. 1 in a course that a locked lid is released.
Figure 6:
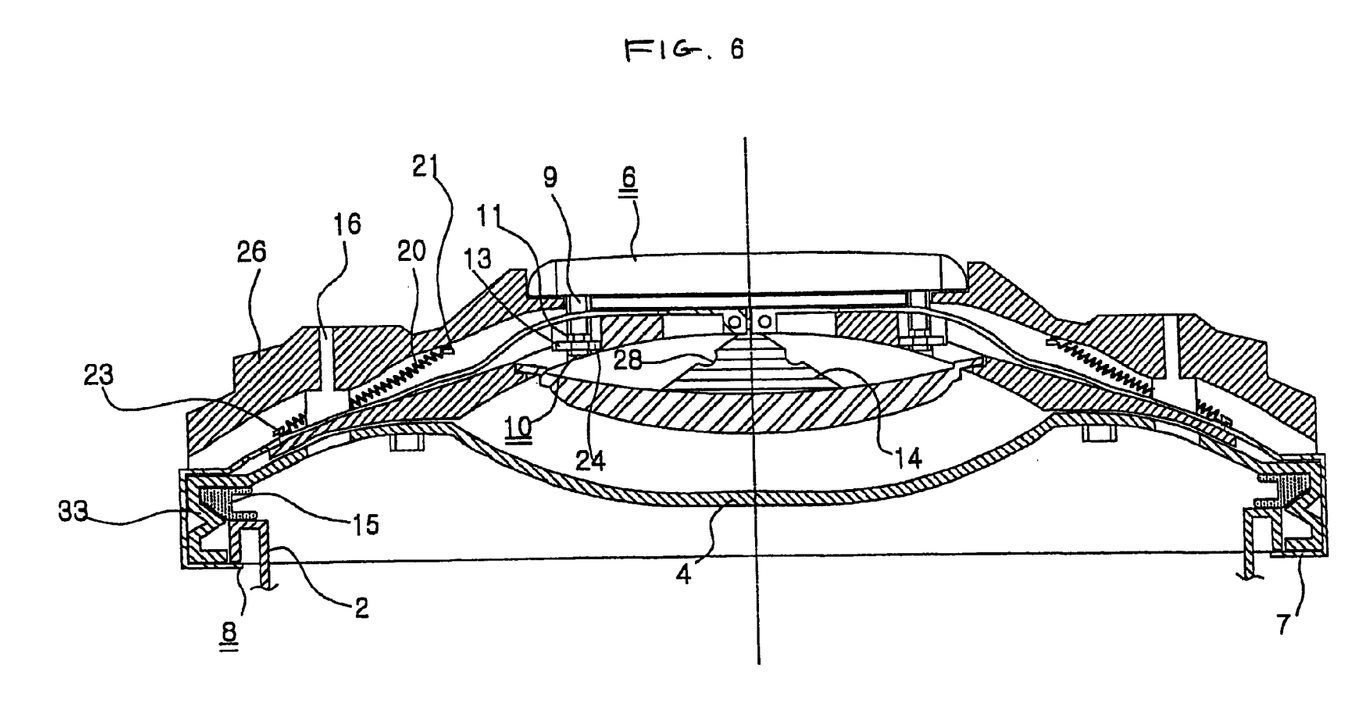
FIG. 6 illustrates a longitudinal sectional view through VI—VI of FIG. 1.
Figure 7:
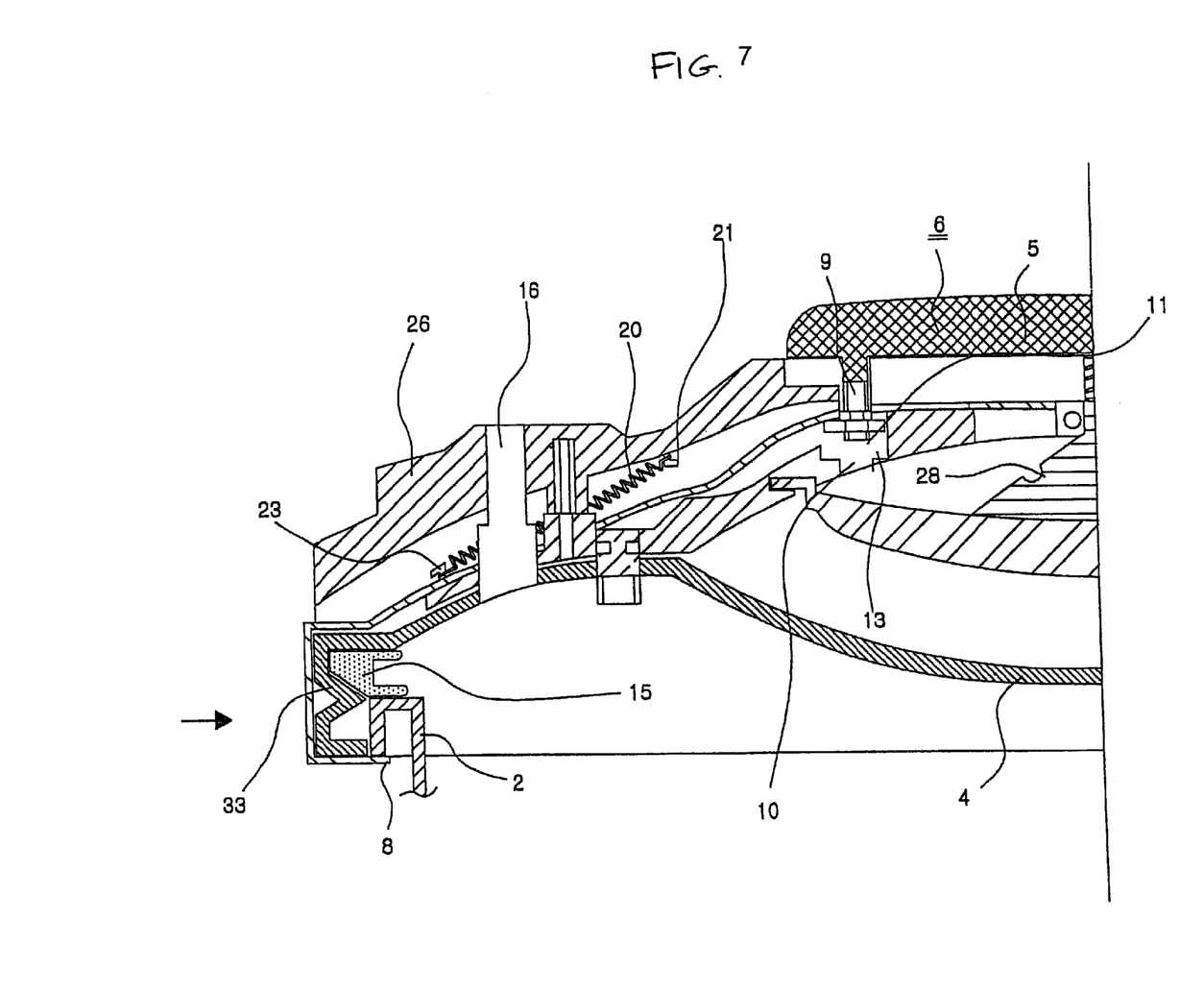
FIG. 7 illustrates a longitudinal sectional view through VI—VI of FIG. 1 in a state that a lid is locked.
Figure 8:
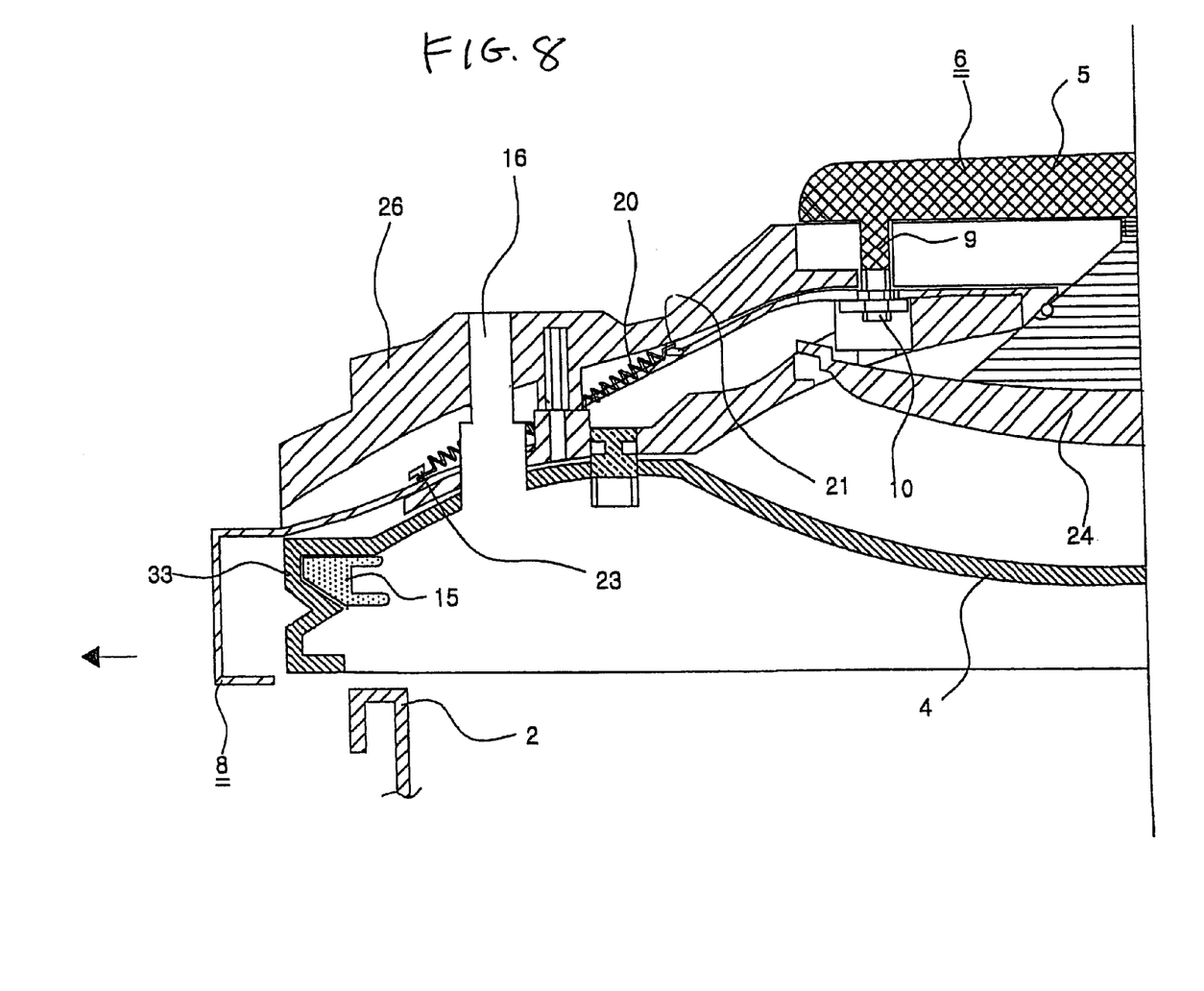
FIG. 8 illustrates a longitudinal sectional view through VI—VI of FIG. 1 in a state that a locked lid is released.

The handle body 26 is assembled by joining an upper plate 29 and a lower plate 31 together in arch shape. Between the upper plate 29 and the lower plate 31, there are a part of the grip lever 24, the clip plate 8, and the push button 6. The upper plate 29 has a space for the push button 6 to be installed thereon and a hole for the opening preventing key grooves 10 to be inserted thereinto. First spring holders 21 are formed on a lower surface of the upper plate 29. The lower plate 31 has a space permitting the grip lever 24 to be raised and lowered thereon. As shown in FIG. 4 and FIG. 5, the handle body including the part of the grip lever 24, the push button 6 and the clip plate 8 is coupled to the lid body 4 with a screw, so as to be separated from and coupled to the lid body 4.

Each of the tension spring 20 is attached to a first spring holder 21 on an end thereof and attached to a second spring holder 23 on other end thereof. The each tension spring is held by the first spring holder 21 and the second spring holder 23, such that the each tension spring constantly pulls the each clip plate 8 to the second direction, namely, an inward direction due to a tensile force. The first spring holder 21 and the second spring holder 23 are installed by twos to stably maintain a force applied to the each clip plate 8. However, the tension spring 20 is required to be one or more in number. In case that one spring is used, the second spring holders 23 of the if each clip plate 8 should be directly connected with the each tension spring 20. In this case, the first spring holders 21 are unnecessary.

A triangular sliding plate 14 is formed on an upper surface of the grip lever 24. The triangular sliding plate 14 serves to move the clip plates 8 by being inserted between the cylindrical rollers 22 which are installed on the one end parts of the clip plates 8 and performing a rise and fall motion. Closure preventing grooves 28 are formed on lower parts on lateral sides of the triangular sliding plate 14.

']'-shaped latch jaws 25 are formed on both sides of the grip lever 24 whose central portion has a shape easily graspable by a hand. Each of the latch jaws 25 is latched on the lower plate 31 on the second poison, thereby preventing the grip lever from coming down further. The each latch jaw 25 of the grip lever 24 has a sufficient length not to be interfered by the lower plate 31, when being raised. One or more latch jaws 25 may be formed on both sides of the grip lever 24. It is desirable that the latch jaws 25 are formed by twos. Alternatively, the grip lever 24 may have a guide hole formed in the latch jaw 25. Between the upper plate 29 and lower plate 31 of the handle body 26, there installed are guide posts, which posts are engaged with the guide holes of the grip lever 24, so that the grip lever is moved along the guide post. Thus, the movement of the grip lever could be more accurate.

When the grip lever 24 is grasped by an operator, the triangular sliding plate 14 is raised, and the each cylindrical roller 22 of the each clip plate 8 is inserted into the each closure preventing groove 28 so that the grip lever is fixed on the first position. At this time, the clip plate 8 is moved to the first direction, thereby opening the lid. In contrast, when the push button 6 is pushed by the operator, the triangular sliding plate 14 is lowered and the each clip plate 8 is centered to the second direction due to the force of the tension springs. The each triangular sliding plate 14 is downwardly moved, and the grip lever 24 is latched on the lower plate 31 of the handle body 26. The each triangular sliding plate 14 is lowered and placed on the second position, and the clip plate 8 is centered on the second direction, thereby sealing the pot 2.

Operation of the preferred embodiment constructed as above will be explained herein after.

The explanation will be started from a state that the pressure pot is not coupled with the lid.

Under the state, the triangular sliding plate 14 is inserted between the cylindrical rollers 22 and placed on the first position, the cylindrical rollers 22 are fixed on the closure preventing grooves 28, the clip plates 8 are pushed to the first direction, namely, an outward direction of the lid body 4 and the opening preventing keys 10 are closely attached on the opening preventing key grooves 12 inside of the clip plates 8.

In order to seal the pressure pot and the lid under this state, the handle body 26 including the grip lever 24 and the push button 6 is grasped and the lid is put on the pressure pot by joining edge portions together. Then, if the push button 6 is pushed, the triangular sliding plate 14 is pushed, downwardly moved by as far as a predetermined distance and fixed to the second position as shown in FIG. 4. In the course that the triangular sliding plate 14 is lowered to the second position, the clip plates 8 are moved to the second direction, namely, the inward direction of the lid body 4 due to the force of the tension spring such that the clips 7 of the clip plates 8 clip the edge portion of the pressure pot and the edge portion of the lid, thereby sealing the pressure pot 2 and the lid. A packing is attached to the portion where the pressure pot 2 and the lid are engaged with each other, thereby enhancing a coupling force. If the clip plate 8 is moved to the second direction, the smaller nut 11 of the each opening preventing key 10 is placed on the outer groove of the each opening preventing key 10. Until the smaller nut 11 of the each open preventing key 10 is entered inside the outer groove 12 of the each opening preventing key groove 12 due to the force of the compression spring 18 and thus the push button 6 is pushed, operation of the system is not locked.

In order to remove the sealed condition where the triangular sliding plate 14 is placed on the second position and the clip plates 8 are fixed on the second direction to couple the pressure pot and the lid, as illustrated in FIG. 5, the push button 6 is pushed to release the locked opening preventing keys 10. Thereafter, the grip lever 24 is upwardly pulled, the clip plates 8 are pushed to the first direction. At this point, the opening preventing keys 10 are placed on the outer grooves of the opening preventing key grooves 12. Operator can release the sealed pressure pot and the lid.

The operation will be explained in detail. Initially, the push button 6 is lightly pushed before the grip lever 24 is pulled. Then, the each opening preventing key groove 12 of the each clip plate 8 becomes free from the smaller nut 11 of the each opening preventing key 10, thereby enabling a position shift. After the push button 6 is lightly pushed, if the grip lever 24 is pulled, the triangular sliding plate 14 is upwardly moved. In process of being upwardly moved, the triangular sliding plate 14 is placed on the first position where the each closure preventing groove 28 is fixed on the each cylindrical roller 22. By virtue of the each closure preventing groove 28, even when an external force is removed from the grip lever 24, the grip lever 24 is not downwardly moved. As the triangular sliding plate 14 is upwardly moved, the each clip plate 8 is pushed to the first direction. When the push button is lightly pushed, the smaller nut 11 of the each opening preventing key 10 which is lowered below the each opening preventing key groove 12 is moved to the inner groove of the each opening preventing groove since the each clip plate 8 is pushed to the first direction. Unless the push button 6 is not pushed by the operator, the smaller nut 11 of the each opening preventing key 10 which is placed on the inner groove is closely attached to the inner groove of the each opening preventing key groove 12 due to the force of the compression spring 18, thereby maintaining the sealed condition of the pressure pot and the lid.

Thus, according to the present invention, the pot 2 and the lid can be sealed and released in a simple manner that the push button 6 formed on the upper part of the handle body 26 and the grip lever 24 formed on the lower part of the handle body 26 are grasped and released.

That is to say, the pot 2 and the lid body 4 can be sealed by pushing the push button 6 which is formed on the upper part of the handle body 26. The sealed pot and lid body can be released by grasping the push button 6 and the grip lever 24. Therefore, the present invention has an advantage that the lid body 5 is easily released from and sealed with the pot 2.

Further, the present invention has another advantage that it gives a fine view of an external appearance since the handle body 26 is attached to the upper surface of the lid body 4, and the pot can be conveniently held up with one hand.

The present invention has still another advantage that it can be washed to every corner since the handle body 26 is separable from the lid body 4.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A device for coupling a lid to pot for sealing a pressure pot and a lid body having a safety valve, the device for coupling a lid to pot comprising:

two clip plates for clipping a portion where the lid body and the pressure pot are engaged with each other;

a handle body for accommodating a part of the clip plate thereinside;

tension springs each being fixed to the handle body on one end thereof and to the clip plates on other end thereof to constantly pull the clip plates toward a second direction, in other words, a central direction of the lid body;

a grip lever being fixed to a first position by being moved with a hand force by as far as a predetermined distance and pushing the clip plates to a first direction, namely, a peripheral direction of the lid body to release a sealed lid body and pressure pot; and a push button for pushing the grip lever to a second position by moving the grip lever which is placed on the first position and forcing the clip plates to be moved to a central direction of a lid due to a force of the tension springs to seal the lid body and the pressure pot.

2. The system of claim 1, wherein the handle body is removably coupled to the lid body.

3. The system of claim 2, wherein the handle body is coupled to the lid body with a screw.

4. The system of claim 1, wherein a cylindrical roller is coupled to an end part of the each clip plate, respectively, the grip lever has a handle portion and a triangular sliding plate, and an apex portion of the triangular sliding plate is inserted between the two cylindrical rollers when the grip lever is grasped with a hand to move the clip plates to the first direction.

5. The system of claim 4, wherein closure preventing grooves are respectively formed on both lower ends of the triangular sliding plate, and when the grip lever is grasped with a hand and reaches the first position, the cylindrical rollers are inserted into the closure preventing grooves not to move the grip lever even when the grip lever is released from the hand force.

6. The system of claim 1, wherein the push button includes opening preventing keys on both sides of a lower part thereof, and at least one compression spring on a central portion of the lower part thereof, each of the clip plates has an opening preventing groove '8' shape through which the opening preventing key are inserted, the opening preventing key includes a support and a key device which has a smaller diameter than that of the opening preventing groove formed in the clip plate and has a diameter larger than that of the hole formed in the handle body wherein the support is inserted, and the compression spring constantly pushes the opening preventing key to be closely attached to the opening preventing groove.

7. The system of claim 6, wherein the support is formed bolt screw on the end portion and the key device has two nuts, one having a larger diameter and the other has a smaller diameter.

8. The system of claim 6, wherein the support is formed nut screw in the end portion and the key device has a washer and a bolt which is fastening the washer to the support, the washer having a diameter lager than that of the hole formed in the handle body wherein the support is inserted, the washer having a diameter smaller than that of the opening preventing groove formed in the clip plate.

* * * * *